June 2, 1936.  H. J. L. FRANK ET AL  2,042,778
ELECTRICAL DISTRIBUTION SYSTEM
Filed Nov. 12, 1934  2 Sheets-Sheet 1
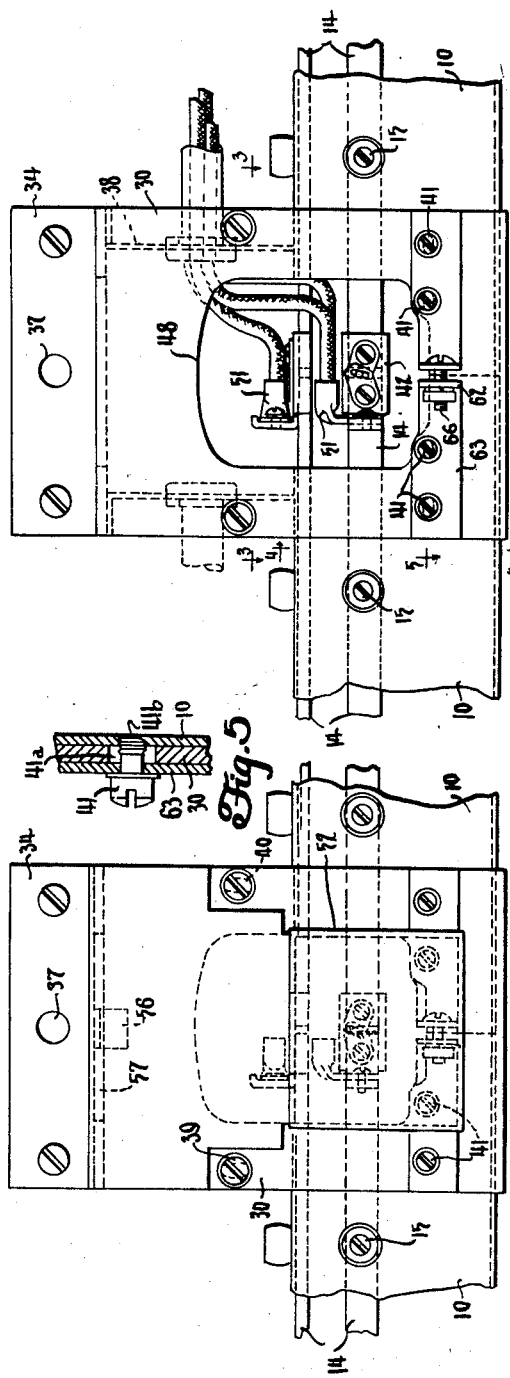
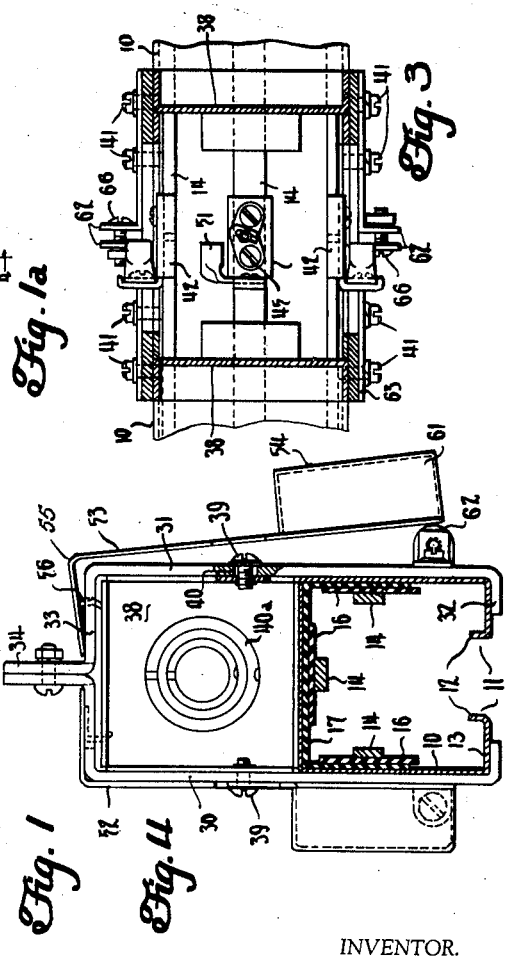
INVENTOR.
Harrison J. L. Frank,
BY William A. Harper
Daniel G. Cullen
ATTORNEY.

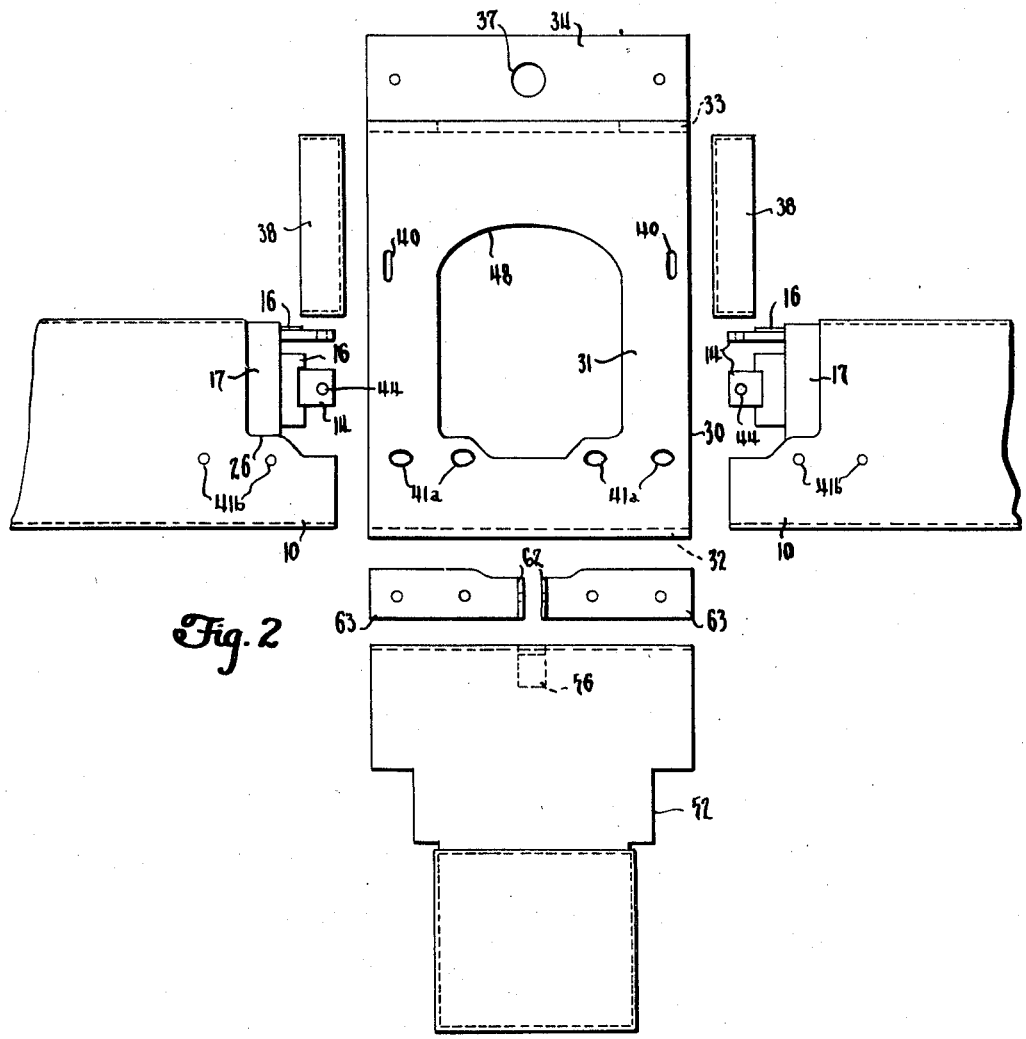

UNITED STATES PATENT OFFICE 2,042,778

ELECTRICAL DISTRIBUTION SYSTEM

Harrison J. L. Frank and William A. Harper, Detroit, Mich., assignors to Bulldog Electric Products Company, Detroit, Mich., a corporation of West Virginia Application November 12, 1934, Serial No. 752,576

4 Claims. (Cl. 247—3)

This application relates to electrical distribution systems of the trolley and trolley duct type, and more particularly to the stationary or trolley duct parts thereof, and specifically relates to novel junctures for trolley duct sections, the junctures being constructed to provide duct hangers and cable connection boxes.

In a prior Patent, No. 2,018,846, October 29, 1935, there is disclosed, in connection with a trolley duct construction, a juncture means constructed to provide a hanger for the duct. The juncture means of the instant application is in general similar to that of the earlier application, differing therefrom principally in the provision of means whereby outside cables may easily be connected to the bus bars of the trolley duct; and of novel details of construction.

For an understanding of the structure of this application reference may be had to the appended drawings showing juncture means and details thereof. In these drawings,·

Fig. 1 shows in side elevation two ends of duct sections, joined to each other by juncture means so constructed as to provide a duct hanger and a cable connection box;

Fig. 1a is a similar view but with a hanger cover plate removed to expose interior parts of the juncture;

Fig. 2 is an exploded side elevational view of the two section ends and the juncture parts, taken from Fig. 1;

Figs. 3–5 are sections as if on corresponding lines of Fig. 1a.

Referring to the drawings, it will be seen that the duct is assembled from a number of duct sections joined to form a continuous duct.

The sections include sheet metal casings 10 of substantially rectangular cross section and having their lower, or bottom, walls provided with slots or openings 11 which provide external access for the trolleys or collectors used in conjunction with the duct.

The edges of the bottom wall openings 11 are turned upwardly, as at 12, to form vertical flanges, bounding the opening 11, and rigidifying the parts 13 of the bottom wall, which parts form rails or tracks for the riding wheels of the trolleys or collectors.

In the multiphase form shown, where three bus bars 14 are provided, the three bus bars will preferably, though not necessarily, be positioned on the three walls of the casing other than the bottom wall, and will be held in place against these walls of the casing by means of insulated screw bolts 15, which pass through holes in the walls and which are threaded into tapped holes of the bus bars, it being understood that the bus bars and the sheet metal casing are initially provided with these holes, for the reception of these screws, at suitable and uniformly spaced intervals. The bus bars are insulated from the sheet metal casing walls by insulating strips 16, of which there is one for each bus bar, and by means of a channel-shaped sheet of insulation 17, of which there is one for each duct section.

Each duct section has two ends and these ends are preferably duplicate in all respects. An end construction will now be described with particular reference to Fig. 2.

As shown in this figure, each end of the sheet metal casing 10 is cut away on the top wall, and on the two side walls, to a point about two-thirds down from the top of the casing, the line of cut for this cutaway being referenced 26. The insulating channel 17 projects beyond the major part of the cut line 26, as indicated, but does not project beyond the end of the casing section 10. Similarly, the insulating strips 16 are permitted to project slightly beyond insulation 17 but do not project beyond the end of the casing section 10. The bus bars 14 project beyond the insulation 16 and 17 and terminate at the end of the casing section 10, all substantially as indicated in Fig. 2.

Section ends are joined to each other by a juncture and hanger construction, as shown. Each hanger includes two bent hanger plates 30 which embrace the section ends so as to enclose and support the same. These hanger plates have vertical plate parts 31 whose lower edges are laterally bent to form supporting flanges 32 and whose upper edges are laterally and then vertically bent, as at 33—34, the last mentioned portions being secured to each other and to fixed structure by bolts passed through the aligned holes 37, of the hanger plates.

Additional ties between the hanger plates 30 are provided by plates 38 having marginal flanges into which are tapped screws 39 passing through clear slots 40 of the hanger plates, the plates 38 forming end enclosures for the connection space above the duct within the hanger plates. These plates 38 are provided with knock-outs 40a which may be removed to permit the entrance of a cable into the connection space within the hanger plates and above the duct, substantially as shown in Fig. 1a.

When an assembly between the end of a previously mounted section and the end of one that is is to be mounted is to be effected, a socket is formed on the end of the mounted section by the hanger plates 30 that are secured to that end of the previously mounted section by means of screws 41 passing through clear slots 41a of the hanger plates and tapped into threaded holes 41b of the duct sections, (Fig. 5), which screws, it is observed, are considerably below the bus bars 14, and which screws do not project into the duct. Into the socket thus formed is thrust and is similarly fastened the end of the section that is to be mounted.

After this is done, the adjacent bus bar ends are secured to one another by means of the bus bar connections. The adjacent ends of the bus bars are bridged by copper connectors 42 whose slots 43 align with tapped holes 44 of the bus bars, and screws 45 pass through the slots 43 into holes 44, the heads of the screws bearing against lock washer plates 46, which are loosely riveted, at 47, to the connectors 42, these washer plates having notched holes 47a for holding the screws 45 non-removable, though loosely movable, with respect to the connectors 42.

The connectors 42, as will be seen, dispose themselves on the outside surfaces of the bus bars, in cutouts or openings 48 of the hanger plates. These cutouts also permit the manipulations necessary to secure and connect the bus bar ends.

It will also be observed that the connectors 42 may be and preferably are provided with lugs 50 to which may be connected cable terminal lugs 51, whereby cables introduced into the connection box through the knock-outs 40a may be physically and electrically connected to the bus bars, with the cutouts or openings 48 of the hanger plates affording access to the screws 51a which connect the cable terminal lugs 51 to the connector lugs 50 of the connectors 42.

To cover these cutouts or holes, hanger cover plates are provided. These cover plates, of which there are two, one for each hanger plate 30, are referenced 52 and include upper portions 53 and lower portions 54. The upper portions 53 are in the nature of vertical plates provided with horizontal flanges 55 having tongues 56 received in slots 57 of the portions 33 of the hanger plates, to form pivotal mountings for the cover plates.

The lower portions 54 of the cover plates include vertical plates provided with flanged edges 61. The cover plate parts 54 align with the holes 48 in the adjacent hanger plates and cover them, the parts 54, however, being spaced from the hanger plates 30 by the flanged edges 61 of the cover plate to provide air chambers around the live ends of the bus bars.

The lower edges 61 of the cover plates frictionally engage the lower surfaces of lugs 62 formed on pull plates 63 lying adjacent the hanger plates, and the frictional engagement thus provided, together with the interlock provided by tongues 56 and slots 57, adequately latches the cover plates in position on the hanger plates.

The pull plates 63 are held onto the hanger plates by the screws 41 threaded into the duct. Through the lugs 62 of the plates 63 pass bolts 66, which, when tightened up, pull the adjacent ends of duct sections towards each other.

*The installation of a duct run*

When a duct run installation is to be effected, the first thing that is done is to install and support the end or first hanger of the series of hangers in a proper and desired location with reference to the building in which the duct run is to be installed. This hanger forms a socket into which may be thrust an end of the first duct section to be installed, and the first hanger will support this end during the time that the installer is lifting the other end and placing on the same the second hanger of the series, after which the installer can raise the second hanger and the second end of the first duct section and support the second hanger with respect to the fixed structure in its proper location. Thus is supported and installed the first section of the duct run.

At this time the installer will thread in screws 41 tightly to support the duct with respect to the hangers firmly, and will tighten up screws 66.

If desired, the installer may at this time bring in a cable feed through the opening 48 of the hanger plates and may connect the cable feed to the first duct section at the first hanger.

He will then mount cover plates 52 on the first hanger and this will complete the installation of the parts at the first hanger.

The installer will then go to the second hanger of the duct and thread the screws 41 inwardly but not tightly. This will adequately secure the second end of the first duct section with respect to the second hanger. Since the second hanger forms a socket, the installer may insert therein the first end of the second duct section. Then he may perform on the second end of the second duct section operations like those he had previously performed on the second end of the first duct section, thus hanging the second duct section.

Then he will go back to the second hanger and connect the bus bars of the first duct section to those of the second duct section and also tighten up the screws 41 and 66, to connect the bus bars and secure the first end of the second duct section properly and tightly with respect to the second hanger.

Then at the second hanger he will snap on the cover plates 52 of that hanger. He will then repeat the operations for the complete duct run.

It will thus be observed that the installation of a complete duct run can be effected by one man, as contradistinguished from present contemplated systems where installation of a sectional duct run requires the presence of two men.

It will also be observed that a duct section may be dropped out from a duct run, in case it is defective, without disturbing any of the duct run except for the one section that is to be dropped out. This contradistinguishes the instant system from systems where it is necessary to remove a number of duct sections in order to drop out an intermediate one. It will be observed that in dropping out a duct section it is necessary merely to loosen certain of the screws at the hangers at the ends of the duct section involved, spread the hangers sufficiently to permit the removal of the defective duct section, and then remove the defective duct section. A non-defective duct section may be inserted into the place formerly occupied by the section removed, and the operations of mounting the non-defective duct section may be accomplished easily and readily and in a manner that can clearly be observed.

It will also be observed that the screws which are manipulated during mounting and dismounting of duct sections, namely, screws 45 and 41, can be manipulated without danger of their being dropped from the duct run. Lock washer plates 46 secure screws 45 against danger of dropping from the run, and the pull plates 63 secure screws 41 against the danger of dropping from the run.

It will also be observed that the feature of having one structure function as a duct juncture as well as a duct hanger is instrumental in promoting the success of a duct run built up of sections such as those shown. Experience indicates that in a sectional duct run installation the presence of misaligned joints leaves cracks and bumps which eventually impairs the efficiency of the trolleys used with the run, and further causes arcing of the bus bars and collectors at the junctures. By virtue of the fact that the duct juncture means also are duct hanger means, alignment of the adjacent duct section ends is automatically assured and continuously maintained, with a consequent increase in the satisfactory performance of the duct run.

It will also be observed that the hanger construction shown is useful not only as a hanger for duct sections at the ends thereof, but may also be used as a hanger for a duct section intermediate the ends of that section. Each hanger is in the nature of a split socket which can be placed around a duct section intermediate its ends, and then secured to fixed structure to form a satisfactory hanger for a duct section intermediate the ends thereof. Under such circumstances the bolts in holes 37 and the screws 39 and plates 38 function to tie the hanger plates to each other and form a rigid socket, partially surrounding and embracing the duct section, and tightening of the screws 66 also operates to maintain a tight engagement between duct parts and the hanger. Screws 41 will of course, under such circumstances, not be threaded into the duct.

We claim:

1. A sectional trolley duct installation comprising sections of trolley duct and combined hangers, cable entrances, and duct juncture means of the type that provide sockets for adjacent ends of duct sections, the sections containing bus bars therein which are to be joined at the duct junctures, the duct and hangers having openings affording access to the bus bar ends within the duct installation for bus bar connection, the hangers also affording entrance for cables to the bus bar junctures from outside the duct, the cables being secured to the bus bars through the duct and hanger openings.

2. A sectional trolley duct installation comprising sections of trolley duct and combined hangers, cable entrances, and duct juncture means of the type that provide sockets for adjacent ends of duct sections, the sections containing bus bars therein which are to be joined at the duct junctures, the duct and hangers having openings affording access to the bus bar ends within the duct installation for bus bar connection, the hangers also affording entrance for cables to the bus bar junctures from outside the duct, the cables being secured to the bus bars through the duct and hanger openings, the openings providing clearance for the bus bar connectors.

3. A sectional trolley duct installation comprising sections of trolley duct and combined hangers, cable entrances, and duct juncture means, the sections containing bus bars therein which are to be joined at the duct junctures, the duct and hangers having openings affording access to the bus bar ends within the duct installation for bus bar connection, the hangers also affording entrance for cables to the bus bar junctures from outside the duct, the cables being secured to the bus bars through the duct and hanger openings.

4. A sectional trolley duct installation comprising sections of trolley duct and combined cable entrances, and duct juncture means, the sections containing bus bars therein which are to be joined at the duct junctures, the duct having openings large enough to afford manual access to the bus bar ends within the duct installation for manipulations of these ends for bus bar connection, the openings also affording entrance for cables to the bus bar junctures from outside the duct, the cable being secured to the bus bars through the openings.

HARRISON J. L. FRANK.
WILLIAM A. HARPER.